(12) United States Patent
Musani et al.

(10) Patent No.: US 11,314,499 B2
(45) Date of Patent: Apr. 26, 2022

(54) SIMULATING END-TO-END UPGRADE PROCESS IN PRODUCTION ENVIRONMENT

(71) Applicant: VMware, Inc., Palo Alto, CA (US)

(72) Inventors: Kavya Reddy Musani, Austin, TX (US); Akash Kodenkiri, Banaglore (IN); Ramesh Vepuri Lakshminarayana, Bangalore (IN); Ramesh Jagannatha Shetty, Bangalore (IN); Clement Jebakumar, Bangalore (IN); Ravi Shankar Nandula, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 171 days.

(21) Appl. No.: 16/573,451

(22) Filed: Sep. 17, 2019

(65) Prior Publication Data

US 2020/0057627 A1   Feb. 20, 2020

Related U.S. Application Data (63) Continuation of application No. 15/406,812, filed on Jan. 16, 2017, now Pat. No. 10,452,377.

(30) Foreign Application Priority Data

Oct. 24, 2016   (IN) .............................. 201641036301

(51) Int. Cl.
    *G06F 8/65*      (2018.01)
    *G06F 11/36*     (2006.01)

(52) U.S. Cl.
    CPC .............. *G06F 8/65* (2013.01); *G06F 11/362* (2013.01)

(58) Field of Classification Search
    CPC .. G06Q 10/06375; G06Q 10/50; G06Q 50/08; G06F 30/20; E01D 22/00; G06N 7/005
    USPC .......................................................... 703/6
    See application file for complete search history.

(56) References Cited

U.S. PATENT DOCUMENTS

| | | | |
|---|---|---|---|
| 2011/0209124 A1* | 8/2011 | Kaur ...................... | G06F 30/00 717/126 |
| 2015/0121357 A1* | 4/2015 | Ha .......................... | G06F 8/65 717/168 |
| 2018/0011741 A1* | 1/2018 | Jayanthi ................ | G06F 9/5072 |

OTHER PUBLICATIONS

Dev_Test_2005 (Accelerated Software Development, Testing and Deployment with the VMware Virtualization Platform, White Paper, 2005). (Year: 2005).*

(Continued)

*Primary Examiner* — Brian S Cook
(74) *Attorney, Agent, or Firm* — Clayton, McKay & Bailey, PC (57) ABSTRACT

System and methods for simulating an end-to-end upgrade process are provided. The method may include collecting, by an upgrade simulator, a system inventory from a production system. The system inventory includes the production system's hardware configuration. The method may include, in response to a determination that the system inventory is compatible with an upgrade software, configuring, by the upgrade simulator, a simulated system having a downsized hardware configuration compared to the production system's hardware configuration. The method may further include upgrading, by the upgrade simulator, the simulated system using the upgrade software, and evaluating, by the upgrade simulator, the simulated system operating with the upgrade software.

19 Claims, 4 Drawing Sheets

(56) References Cited

OTHER PUBLICATIONS

VMware_2009 (VMware vCenter Update Manager Administraton Guide, VCenter Update Manager 4.0 2009). (Year: 2009).*
ESX_2012 (Installing ESXi/ESC 4.1 and vCenter Server 4.1 best practices (1022101), Jul. 12, 2012). (Year: 2012).*
Cripeoblade_2010 (How do I determine my games minimum hardware/software requirements, game development, Jul. 15, 2010) (Year: 2010).*
Forum_2015 (Simulating a lower-spec pc on your pc, Sep. 10, 2015 downloaded from http://www.tomshardware.com/answers/id-2794493/simulating-lower-spec.html) (Year: 2015).*
Stackoverflow, "How to Simulate Lower CPU Processor Machines for Browser Testng", 2009 https://stackoverflow.com/questions/1928534/how-to-simulate-lower-cpu-processor-machines-for-browser-testing (Year: 2009).
tomshardware,com, "Simulating a lower-spec pc or your pc—(Solved)—Overlocking .pdf", Sep. 2015 http://www.tomshardware.com/answers/id-2794493/simulatlng-lower-spec.html (Year: 2015).
windowscentral.com How to use virtual machines to test Windows 10 Insider builds without risking your system, Dec. 16, 2016 (Year: 2016).

* cited by examiner

SIMULATING END-TO-END UPGRADE PROCESS IN PRODUCTION ENVIRONMENT

This application claims priority as a continuation of U.S. patent application Ser. No. 15/406,812, filed Jan. 16, 2017, which is expressly incorporated herein in its entirety.

RELATED APPLICATIONS

Benefit is claimed under 35 U.S.C. 119(a)-(d) to Foreign Application Serial No. 201641036301 filed in India entitled "SIMULATING END-TO-END UPGRADE PROCESS IN PRODUCTION ENVIRONMENT", on Oct. 24, 2016, by VMware, Inc., which is herein incorporated in its entirety by reference for all purposes.

BACKGROUND

Significant resources may be required to plan ahead a software upgrade process and implement the upgrade process on a computer system currently in production. Any upgrade software release may include enhancements and changes that can bring unpredictable impacts to the production computer system. However, even careful preparation and knowledge of the upgrade software release and the product computer system may not guarantee the success of the upgrade process. If any issues arise during or after the upgrade process, the production computer system may encounter expensive downtime or be forced to roll-back to its original state before upgrade.

SUMMARY

System and methods for simulating an end-to-end upgrade process are provided. The method may include collecting, by an upgrade simulator, a system inventory from a production system. The system inventory includes the production system's hardware configuration. The method may include, in response to a determination that the system inventory is compatible with an upgrade software, configuring, by the upgrade simulator, a simulated system having a downsized hardware configuration compared to the production system's hardware configuration. The method may further include upgrading, by the upgrade simulator, the simulated system using the upgrade software, and evaluating, by the upgrade simulator, the simulated system operating with the upgrade software.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Figure 1:
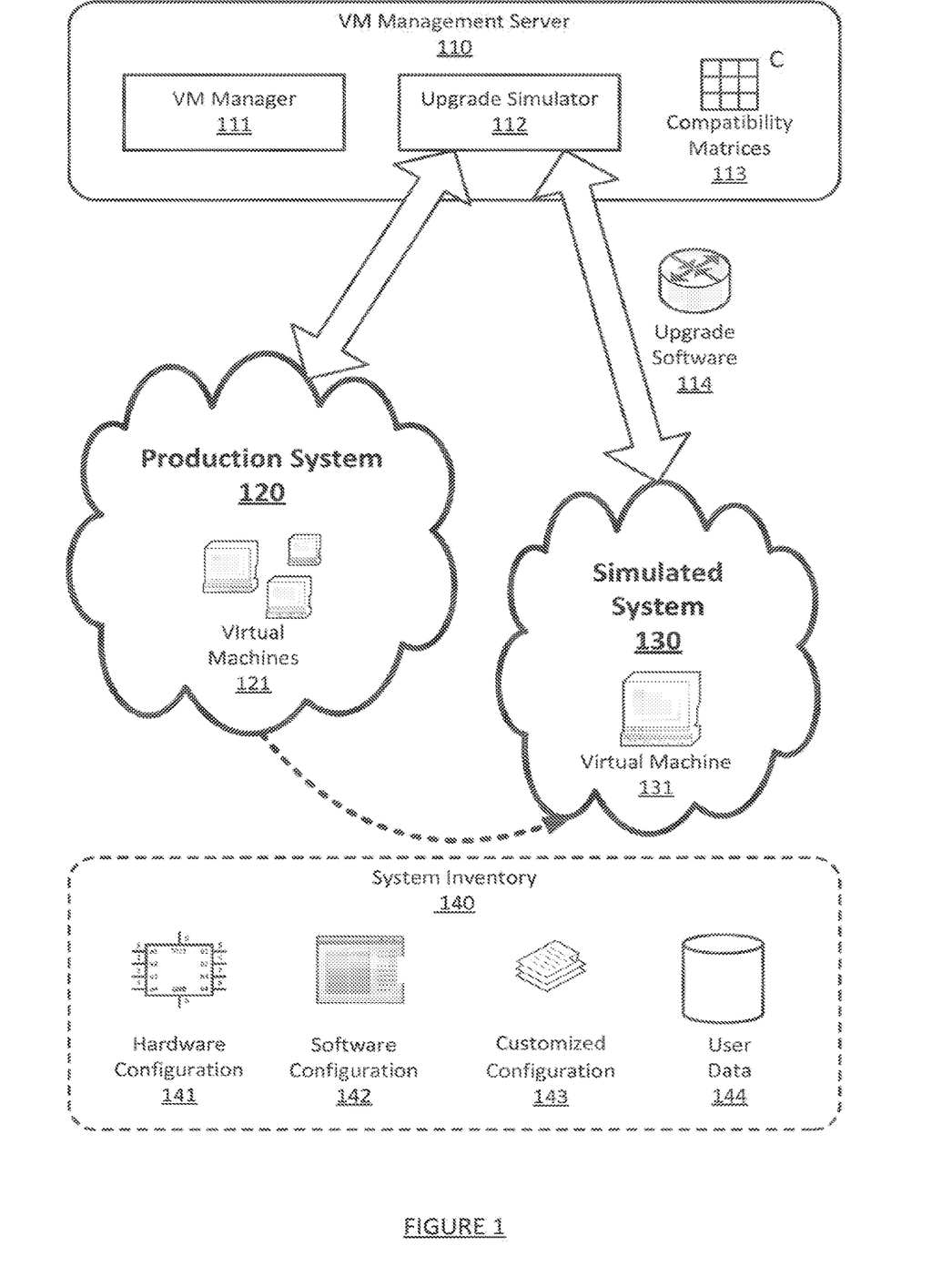
FIG. 1 illustrates a block diagram of an, upgrade system configured to simulate end-to-end upgrade process on a production environment, according to one or more embodiments of the present disclosure.

FIG. 1 illustrates a block diagram of an, upgrade system configured to simulate end-to-end upgrade process on a production environment, according to one or more embodiments of the present disclosure. In FIG. 1, the upgrade system may include a VM management server 110 interacting with one or more production systems 120. The production system 120 may be a computer system required to undergo an upgrade process for installing an upgrade software 114. The VM management server 110 may be configured to simulate this upgrade process by configuring a simulated system 130 based on the production system 120, and applying the upgrade software 114 to the simulate system 130 before performing an actual upgrade process on the production system 120.

In some embodiments, the production system 120 may be a single computer, a single virtualized machine (VM), or a VM server. The production system 120 may also include multiple computers, VMs, or servers working in tandem. The multiple computers in the production system may interact among themselves via Transmission Control Protocol/Internet Protocol (TCP/IP), Hypertext Transfer Protocol (HTTP), or any other network communication means. The production system 120 may also be a network-based, virtualized computing architecture (e.g., a VM cloud) that provides shared pools of cloud resources on demand. The VM cloud may contain, among other components, one or more VMs 121.

In some embodiments, the production system 120 may be constructed based on a physical hardware configuration. The "physical hardware configuration" may include various "physical hardware components" such as, without limitation, physical Central Processing Units (CPUs), physical memory, physical storage (e.g., hard drive), physical Network Interface Card (NIC), and/or additional electronic circuit components (all of which are not shown in FIG. 1). The physical CPU may be a general-purpose or specialized computing processor having electronic circuitry to perform arithmetical, logical, and input/output operations for the production system 120. The physical memory may be hardware storage devices having integrated circuits for storing information used in the production system 120. The physical memory may be volatile memory (e.g., dynamic random-access memory (DRAM) or CPU cache memory) or non-volatile memory (e.g., hard drive or flash memory). In some embodiments, the physical memory may be non-transitory computer-readable storage medium, containing a set of instructions which, when executed by the physical CPU, cause the physical CPU to perform embodiments of the present disclosure. The NIC may be network communication hardware for transmitting messages internal or external to the production system 120.

In some embodiments, the VM management server 110 may include a VM manager 111 to provide centralized management of the VMs 121 contained in the production system 120. The VM manager 111 may perform management tasks such as VM creation, VM configuration, VM updates, VM cloning, etc. Based on the created VMs 121, the VM manager 111 may install additional software applications and import data onto the VMs 121. In some embodiments, the VM management server 110 may be a VMWARE® vCenter server installed on MICROSOFT WINDOWS® server or a LINUX® server.

In some embodiments, the VM manager 111 may create a VM 121 based on the physical hardware configurations of one or more physical computer systems (not shown in FIG. 1). In other words, a "virtual machine", or VM, may be an abstraction of an actual physical computer system. The VM manager 111 may include a "hypervisor" to construct a "virtual hardware configuration" based on the physical hardware configuration. The virtual hardware configuration of the VM 121 may include one or more "virtual hardware components" such as, without limitation, virtual CPUs, virtual memory, virtual storage, virtual NIC, and/or additional virtual components. With helps from the VM manager 111, the virtual hardware components may emulate the behaviors and the computing capabilities of the physical hardware components, thereby allowing the VM 121 to function as if it were a physical computer system. In some embodiments, the VM manager 111 may install a guest OS and various software applications onto the VM 121. Thus, the "hardware configuration" of the production system 120 may include the production system 120's physical hardware configuration and virtual hardware configuration.

In some embodiments, the production system 120 may be implemented with a software configuration. The "software configuration" may include various "software components" such as, without limitation, operating system (OS), firmware, device drivers, software applications, and other computer programs. The OS may be a system software that manages hardware and software resources, and provides common services for other computer programs. For example, the OS may be a WINDOWS®, UNIX®, LINUX®, or iOS® operating system. The "firmware" may be a low-level computer program that controls embedded modules, peripherals, and other physical hardware components. The "device driver" may be a specialized hardware-dependent computer program to allow transparent interaction with physical hardware components.

In some embodiments, the "software application" may include any computer program designed to perform a specific set of coordinated functions, tasks, or activities for the benefit of the end users. Examples of software application may include, without limitations, word processor, spreadsheet, accounting application, database, web browser, media player, graphic editor, game, or photo editor. The software application may also include mission-critical enterprise management and production engineering applications, such as enterprise resource planning (ERP), document management, business workflow management, hardware engineering and software engineering applications.

In some embodiments, the production system 120's hardware configuration and software configuration may be associated with a set of customized configurations and user data. A "customized configuration" may be an arrangement or setup for adjusting the functions and performances of the hardware configuration or software configuration. The customized configuration may also include a certificate (e.g., authentication certificate, network certificate, plug-in certificate) associated with a software application or a hardware component in the production system 120. The "user data" may be any personalized or proprietary data that are created or used by end users of the production system 120.

In some embodiments, the production system 120 may be a live and operating-in-real-time system installed with mission-critical applications. The production system 120 may concurrently be used by multiple end users. Therefore, the VM management server 120 needs to be careful in preparation of the upgrade process. The VM management server 120 may also need to be aware of any potential issues that may arise during or after the upgrade process, in order to reduce or eliminate any downtime to the production system 120 and negative impacts to the mission-critical applications and their end users.

In some embodiments, the VM management server 120 may include an upgrade simulator 112 configured to manage and perform an upgrade process on the production system 120. "Upgrading" or an "upgrade process" may refer to an operation/process to install a specific version of a software application ("upgrade software") onto a computer system. Typically, the upgrade software may be a later-version of a software application intended to replace an earlier-version of the same software application. Alternatively, upgrading may also include reversing or rolling, a later-version of the software application back to an earlier-version of the software application. In other situations, upgrading may also include an operation/process to switch one vendor's software application to another vendor's same or similar software application, to install a new software application, or to apply software patches and bug fixes.

In some embodiments, an upgrade process may be an in-place upgrade process or an out-of-box upgrade process. An "in-place" upgrading may refer to an upgrade process which takes place on top of an already existing environment. For example, for a computer that already installed with a current version of OS (e.g., MICROSOFT® WINDOWS® 7), an in-place upgrade to a later version of OS (e.g., MICROSOFT® WINDOWS® 8) will install the upgrade OS onto the same place (e.g., file folders) that contains the current OS. Thus, in-place upgrading may also be referred to as a "reinstallation" or "repair" upgrading. In comparison, an "out-of-box" upgrading may refer to an upgrade process which takes place in a fresh and new environment. For example, out-of-box upgrade of an OS may remove the original OS before installing the upgrade OS onto a refreshed computer system.

In some embodiments, instead of directly performing an upgrade process on the production system 120, the upgrade simulator 112 may be configured to construct a simulated system 130 based on the production system 120, and perform an end-to-end upgrade process on the simulated system 130 beforehand. An "end-to-end" upgrade process may include multiple upgrade operations to ensure the success of upgrading the production system 120, starting from the scheduling of the software upgrade, all the way to the evaluating of the upgraded system. For example, an end-to-end upgrade process may include, without limitations, the following upgrade operations: system-probe; compatibility-check; inventory-downsize; environment-setup; data-folder-creation; software-upgrade; result-evaluation. Thus, the upgrade simulator 112 may automatically perform each of the above upgrade operations, and stop the end-to-end upgrade process upon detecting any errors or issues in any of the upgrade operations. After the upgrade simulator 112 determines that the end-to-end upgrade process performed on the simulated system 130 is successfully, the upgrade simulator 112 may then perform an actual upgrade process on the actual production system 120. In other words, the upgrade simulator 112 may perform a mock-up run of the entire upgrade process on the simulated system 130, without affecting or having to shut-down the production system 120.

In some embodiments, the upgrade simulator 112 may perform a system-probe upgrade operation to pre-check the production system 120, in order to make sure that the existing environment on the production system 120 is intact and operating normally. The upgrade simulator 112 may then perform a compatibility-check upgrade operation by collecting system inventory 140 (e.g., information related to servers, machines, resources, network, and software) from the production system 120. Since the production system 120 may be implemented using one or more VMs 121, the upgrade simulator 112 may communicate with the VM manager 111 to dynamically extract the system inventory 140 from the production system 120. Afterward, the upgrade simulator 112 may check for compatibility of the upgrade software 114 by evaluating the system inventory 140 based on compatibility matrices 113 associated with the upgrade software 114. If there are any issues arising from the upgrade software 114 being incompatible with the production system 120, the upgrade simulator 112 may stop the end-to-end upgrade process, and generate reports to identify the incompatibilities and mismatches.

In some embodiments, the system inventory 140 collected by the upgrade simulator 112 may include, without limitations, the production system 120's hardware configuration 141, software configuration 142, customized configuration 143, and user data 144. The upgrade simulator 112 may utilize the hardware configuration 141 to determine whether the production system 120 may require additional system resources to sustain the upgrade software 114, and to construct the simulated system 130 based on the production system 120. The upgrade simulator 112 may utilize the software configuration 142 to determine whether the production system 120 may have any software incompatibility issues with the upgrade software 114. Since the customized configuration 143 and user data 144 may also be affected by the upgrade software 114, the upgrade simulator 112 may migrate these customized configuration 113 and user data 114 from the production system 120 to the simulated system 130.

In some embodiments, the upgrade simulator 112 may perform an inventory-downsize upgrade operation to determine a downsized inventory for the simulated system 130. The "downsized inventory" may have a reduced inventory size compared to the system inventory 140. Specifically, the downsized inventory may have a reduced hardware configuration compared to the hardware configuration 141, a reduced software configuration compared to the software configuration 142, a reduced customized configuration compared to the customized configuration 143, and a reduced user data compared to the user data 144 of the system inventory 140.

In some embodiments, the upgrade simulator 112 may perform an environment-setup upgrade operation to construct the simulated system 130 based on the downsized inventory. Since the simulated system 130 may be implemented using one or more VMs 131, the upgrade simulator 112 may communicate with the VM manager 111 to create the necessary hardware components (e.g., VMs 131) and install corresponding software components in the simulated system 130 according to the downsized inventory. Afterward, the upgrade simulator 112 may perform a data-folder-creation upgrade operation to apply the customized configuration 143 and import the user data from the downsized inventory to the simulated system 130.

In some embodiments, once the simulated system 130 is configured to a degree that can mimic the production system 120, the upgrade simulator 112 may perform a software-upgrade operation on the simulated system 130 using the upgrade software 114. Afterward, the upgrade simulator 112 may perform an upgrade-evaluation operation on the upgraded simulated system 130 for any upgrade or performance related issues. Thus, the upgrade simulator 112 may perform the end-to-end upgrade process to determine whether the upgrade software 114 is compatible with the production system 120. After determining that the upgrade process performed successfully on the simulated system 130, and all aspects of the simulated system 130 function as intended, then the upgrade simulator 112 may actually install the upgrade software 114 onto the production system 120. Any issue found during the upgrading of the simulated system 130 may be examined and fixed without impacting the production system 120.

Thus, the above approach takes into consideration the performance of the production system and its resources (e.g., network speed), as well as the compatibility of the upgrade software with the production system's inventory features, thereby allowing the simulated upgrade process to match as closely as possible to the real-time production environment. For an enterprise production system having multiple hardware and servers, the upgrade simulator 112 may greatly reduce the efforts of the IT administrators in planning and executing system upgrades, and greatly shorten the production system's downtime.

Figure 2:
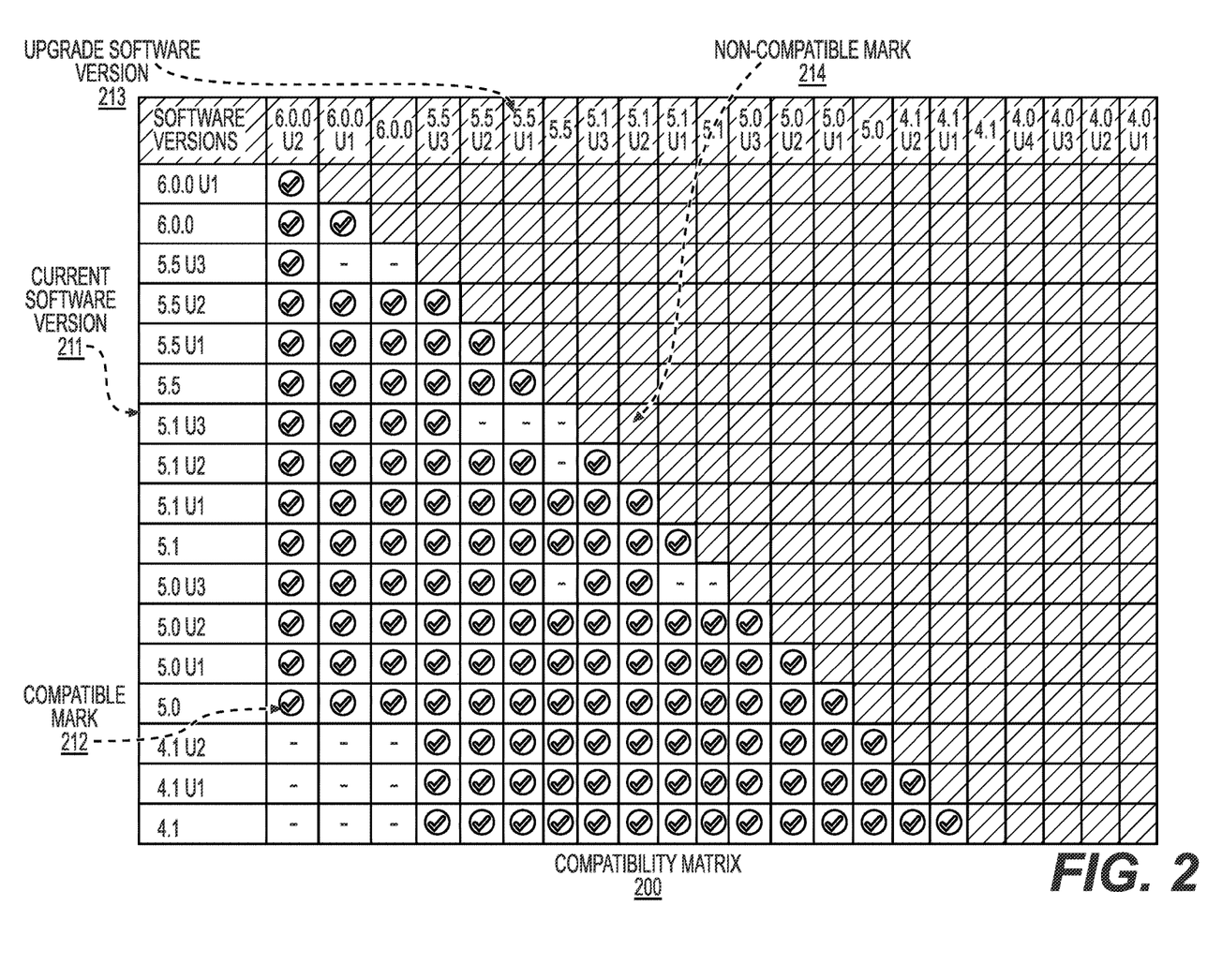
FIG. 2 illustrates a compatibility matrix used during an upgrade process, according to one or more embodiments of the present disclosure.

FIG. 2 illustrates a compatibility matrix used during an upgrade process, according to one or more embodiments of the present disclosure. In FIG. 2, an upgrade simulator (similar to the upgrade simulator 112 of FIG. 1) may utilize one or more compatibility matrices 200 to determine whether an upgrade software is compatible with a production system. Specifically, the upgrade simulator may collect system inventory from the production system, and evaluate the system inventory based on the compatibility matrices 200. For example, the upgrade simulator may perform compatibility checks by using one or more hardware compatibility matrices 200 against the hardware configuration in the system inventory; or using one or more software compatibility matrices 200 against the software configuration in the system inventory.

In some embodiments, the upgrade simulator may utilize a software compatibility matrix (e.g., compatibility matrix 200) to determine whether a current version of software can be upgraded to a newer version of software. The software compatibility matrix 200 may contain a list of current software versions on its left column, and a list of upgrade software ("newer software") versions on its top row. Each of the current software versions may represent a specific current software version that may be installed in a production system. And each of the upgrade software versions may indicate a specific software version for upgrading the production system. In the compatibility matrix 200, a compatible mark (e.g., compatible mark 212) may be associated with a specific current software version (located in the left-most column, and in the same row as the compatible mark) and a specific upgrade software version (located in the top-most row, and in the same column as the compatible mark), indicating that the specific current software version can be upgraded to the specific upgrade software version. A non-compatible mark (e.g., non-compatible mark 214) may also be associated with a specific current software version and a specific upgrade software version, indicating that the current software version cannot be upgraded to the upgrade software version.

In some embodiments, the upgrade simulator may be able determine whether a production system may be able to upgrade to a specific version of upgrade software. Assuming a production system installed with a current software version of "5.1 U3" needs to be upgraded to an upgrade software version of "6.0.0 U1." Based on the compatibility matrix 200 in the FIG. 2 example, the upgrade simulator may locate the current software version 211 in the compatibility matrix 200, and review the compatible marks and non-compatible marks located on the same row as the current software version 211. As indicated by these marks, version "5.1 U3" may be upgraded to version "6.6.6 U2", version "6.0.0 U1", version "6.0.0", or version "5.5 U3", but may not be upgraded to any versions lower than the version "5.5 U2." Thus, the upgrade simulator may determine that the production system can be upgraded from version "5.1 U3" to version "6.0.0 U1."

In some embodiments, the upgrade simulator may utilize a hardware compatibility matrix to determine whether a current version of software can be upgraded to a newer version of software. The hardware compatibility matrix may be similar to the compatibility matrix 200, and may contain a list of memory amounts on its left column, as well as a list of upgrade software versions on its top row. Each of the memory amounts may represent a specific memory amount in a production system. And each of the upgrade software versions may indicate a specific software version for upgrading the production system. In such a hardware compatibility matrix, a compatible mark may be associated with a specific memory amount and a specific upgrade software version, indicating that the specific memory amount can support the specific upgrade software version. A non-compatible mark may also be associated with a specific memory amount and a specific upgrade software version, indicating that the memory amount cannot support the upgrade software version. Thus, the upgrade simulator may be able to utilize such a hardware compatibility matrix to determine whether the production system having a specific amount of memory may support the upgrade process.

In some embodiments, the upgrade simulator may maintain a corresponding compatibility matrix for each specific hardware component or software component that may affect or be affected by the upgrade process. In other words, for each specific hardware component or software component in the system inventory, the upgrade simulator may maintain a corresponding compatibility matrix showing the compatibility relationships among the components various capacities and the upgrade software versions. Thus, the upgrade simulator may quickly determine whether a specific upgrade software may be compatible with the production system by evaluating these compatibility matrices and the upgrade software.

Figure 3:
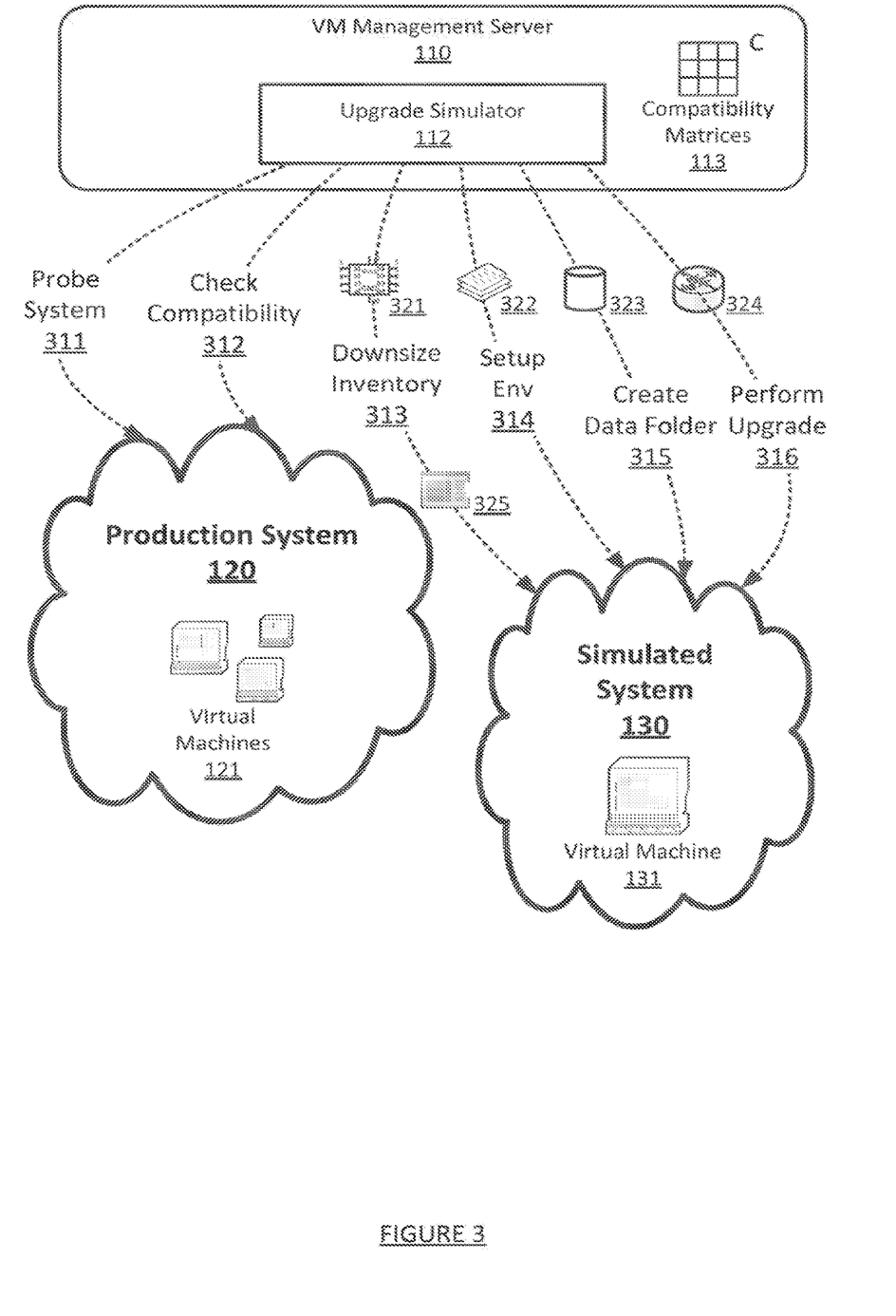
FIG. 3 illustrates multiple scenarios in which an upgrade simulator is configured to simulate end-to-end upgrade process, according to one or more, embodiments of the present disclosure.

FIG. 3 illustrates multiple scenarios in which an upgrade simulator is configured to simulate end-to-end upgrade process, according to one or more embodiments of the present disclosure. In FIG. 3, the VM management server 110, the upgrade simulator 112, the production system 120, the simulated system 130, as well as the associated components contained therein, all correspond to their respective counterparts in FIG. 1.

In FIG. 3, before upgrading the production system 120 with a specific version of upgrade software, the upgrade simulator 112 may be configured to automatically upgrade a simulated a simulated system 130 with the upgrade software, in order to determine whether such an upgrade process may have any potential issues that may prevent a successful upgrade. Specifically, the upgrade simulator 112 may start the end-to-end upgrade process by performing a system-probe operation (311) on the production system 120. If during the system-probe operation, the upgrade simulator 112 determines that any of the hardware components or software components in the production system 120 is functioning abnormally, or any of the essential components is missing, the upgrade simulator 112 may terminate the end-to-end upgrade process, and report any issues identified during the probing stage. In response to a determination that the production system 120 is intact, the upgrade simulator 112 may proceed to the next operation on the end-to-end upgrade process.

In some embodiments, the upgrade simulator 112 may perform compatibility-check operation (312) on the production system 120 by collecting system information from the production system 120 and generating a corresponding system inventory. For example, assuming the production system needs to upgrade its VMWARE® vCenter Server Appliance (VCSA) software suite, the upgrade simulator 112 may identify and collect various hardware components (e.g., VMWARE® Clusters, VMWARE® ESX servers, VMWARE® NSX, and VMWARE® vSAN) from the production system 120 as hardware configuration in the system inventory. The upgrade simulator 112 may further extract software components (e.g., VMWARE® vSphere) from the production system 120 as software configuration in the system inventory. Afterward, the upgrade simulator 112 may extract relevant customized configuration and user data from the production system 120 into the system inventory.

In some embodiments, the upgrade simulator 112 may evaluate the system inventory for compatibility with the upgrade software. Specifically, the upgrade simulator 112 may utilize multiple software compatibility matrices and hardware compatibility matrices, to determine whether there is any configuration in the production system 120 that may be incompatible with the upgrade software. For example, if a compatibility matrix indicates that VMWARE® vSphere Hypervisor (ESXi) 5.1 is not supported on the VCSA version 6.5, and the system inventory shows that the production system 120 is installed with VCSA version 6.5, then the upgrade simulator 112 may determine that the upgrade software ESXi version 5.1 is incompatible with the production system, and terminate the end-to-end upgrade process with reports of this software compatibility issue. On the other hand, if determining that there is no compatibility issue found during the compatibility-check operation, the upgrade simulator 112 may proceed to the next operation on the end-to-end upgrade process.

In some embodiments, the upgrade simulator 112 may perform an inventory-downsize operation (313) based on the system inventory collected from the production system 120. The upgrade simulator 112 may determine the minimum amount of hardware and software configuration that can properly represent the production system 120. Such minimum amount of hardware configuration (321) and software configuration (325) may be deemed a downsized inventory 322 for the simulated system 130. With respect to hardware components, the upgrade simulator 112 may determine a minimum number of clusters, servers, CPUs, memory, storage spaces, network setup for the downsized inventory 322. For example, assuming the system inventory indicating that the production system 120 may contain 10 clusters of VMs 121, the upgrade simulator 112 may determine that 2 clusters of VMs 131 may be sufficient for simulating interconnectivities among the VMs 121. Thus, the upgrade simulator 112 may determine a downsized inventory 322 of 2 clusters of VMs 131 for the simulated system 130.

In some embodiments, with respect to software components, the upgrade simulator 112 may determine a minimum set of OS and software applications for the downsized inventory 322. For example, assuming the system inventory indicating that the production system 120 may be installed with a specific version of OS and various software applications, the upgrade simulator 112 may determine that only the OS and virtualization software applications may be related to a VM management upgrade software. Thus, the upgrade simulator 112 may determine a downsized inventory 322 without any other software applications such as entertainment or graphic applications. In some embodiments, the upgrade simulator 112 may provide multiple options to an administrator for selecting different sized inventories for the simulated system 130. Alternatively, the upgrade simulator 112 may replicate the whole hardware and software configurations of the production system 120 on the simulated system 130 without downsizing the system inventory.

In some embodiments, the upgrade simulator 112 may perform an environment-setup operation (314) on the simulated system 130. Based on the downsized inventory 322, the upgrade simulator 112 may construct the necessary hardware components in the simulated system 130, and install the necessary software components onto the simulated system 130. In some embodiments, the upgrade simulator 112 may construct the simulated system 130 using virtualized hardware components, such as VMs and virtual network. Since virtualized hardware components may be dynamically created in real-time without human intervention, even if the production system 120 may be constructed based on physical hardware components with little or no virtual hardware components, the simulated system 130 may nevertheless be created using virtual hardware components to mimic the production system 120's physical hardware components.

For example, the production system 120 may include physical network components to manage network communications among the VMs 121. The upgrade simulator 112 may create virtualized network components to simulate similar network interconnectivities among the multiple VMs 131 in the simulated system 130. Likewise, by utilizing virtualized hardware components, the upgrade simulator 112 may remotely install the OS and software applications in the reduced inventory onto the simulated system 130 without physically accessing the virtualized hardware components or requiring human intervention.

In some embodiments, the upgrade simulator 112 may perform a data-folder-creation operation (315) in the simulated system 130. Specifically, the upgrade simulator 112 may prepare data folders in the simulated system 130 for importing customized configuration and user data 323. Afterward, the upgrade simulator 112 may apply the customized configurations and import a sample of the user data 323 in the reduced inventory into the simulated system 130. For example, the upgrade simulator 112 may select 10%-50% of the user data 323 for importing. Alternatively, the upgrade simulator 112 may import dummy data into the simulated system 130. At this point, the simulated system 130 may be deemed ready for simulating the upgrade operation.

In some embodiments, the upgrade simulator 112 may perform the software-upgrade operation (316) in the simulated system 130 using the upgrade software 324. Specifically, the upgrade simulator 112 may perform the upgrade operation as if it were performed on the production system 120. For example, the upgrade simulator 112 may perform an in-place or out-of-box upgrading on the simulated system 130, and/or reboot the simulated system 130 during the upgrade operation. The upgrade simulator 112 may also record any defective issues identified or warning messages generated during the upgrade operation. After the upgrade operation is completed, the upgrade simulator 112 may perform a result-evaluation operation to, measure the functionalities and performance of the simulated system 130 installed with the upgrade software.

In some embodiments, if the result-evaluation operation indicated that the simulated system performs normally or as intended, the upgrade simulator 112 may be configured to perform the software-upgrade operation on the production system 120. Alternatively, if the result-evaluation operation indicated that the simulated system is not performing as planned, the upgrade simulator 112 may stop any software-upgrade operation to be performed in the production system 120. By using the above approach, the upgrade simulator 112 may greatly increase the chance of successfully upgrading the production system 120, without incurring significant downtime or facing potential unknown upgrade issues.

Figure 4:
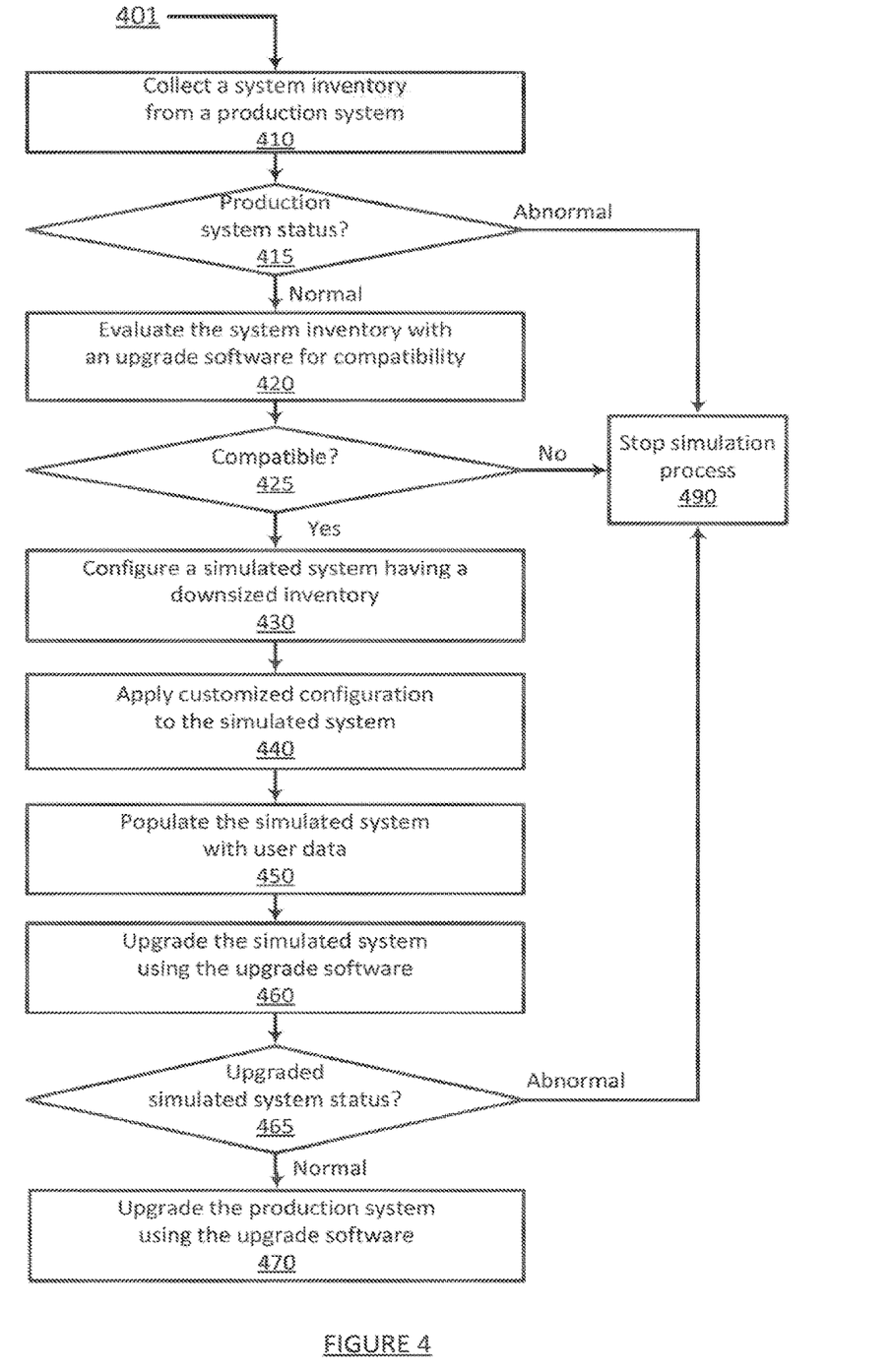
FIG. 4 shows a flow diagram illustrating a process to simulate an end-to-end upgrade process, according to one or more embodiments of the present disclosure.

FIG. 4 shows a flow diagram illustrating a process to simulate an end-to-end upgrade process, according to one or more embodiments of the present disclosure. The processes 401 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 410, an upgrade simulator may be configured to probe a production system for operating status and collect a system inventory from the production system. The collected system inventory may include the production system's hardware configuration, software configuration, customized configuration, and user data.

At block 415, the upgrade simulator may evaluate the operating status of the production system. In response to a determination that the production system is operating abnormally, the process 401 may proceed to block 490, in which the upgrade simulator may stop the subsequent configuring of the simulated system and the subsequent upgrading of the simulated system. If the upgrade simulator determines that the product system is operating normally, the process 401 may proceed to block 420.

At block 420, the upgrade simulator may evaluate the production system's hardware configuration and software configuration with the upgrade software based on compatibility matrices. Specifically, the upgrade simulator may evaluate the production system's hardware configuration with the upgrade software based on a hardware compatibility matrix, and evaluate the production system's software configuration with the upgrade software based on a software compatibility matrix. In some embodiments, the software configuration includes production system's firmware and device drivers associated with production system's hardware configuration.

At block 425, the upgrade simulator may determine whether the upgrade software is compatible with the production system based on the system inventory. In response to a determination that the upgrade software is incompatible with the production system, the process 401 may proceed to block 490, in which the upgrade simulator may stop the subsequent configuring of the simulated system and the subsequent upgrading of the simulated system. If the upgrade simulator determines that the upgrade software is compatible with the production system, the process 401 may proceed to block 430.

At block 430, the upgrade simulator may configure a simulated systen having a downsized inventory compared to the production system's system inventory. Specifically, the downsized inventory may include a subset of the production system's hardware configuration, software configuration, customized configuration, or user data.

At block 440, the upgrade simulator may apply the production system's customization configuration, which may be in the downsized inventory, to the simulated system.

At block 450, the upgrade simulator may populate the production system with a subset of user data in the downsized inventory.

At block 460 the upgrade simulator may upgrade the simulated system using the upgrade software.

At block 465, the upgrade simulator may evaluate the simulated system operating with the upgrade software. In response to a determination that the simulated system with the upgrade software is performing abnormally, the process 401 may proceeds to block 490, in which the upgrade simulator may stop the subsequent upgrading of the production system with the upgrade software. If the upgrade simulator determines that the simulated system using the upgrade software is operating normally; the process 401 may proceed to block 470.

At block 470, the upgrade simulator may deem the simulated upgrade process on the simulated system a success, and upgrade the production system with the upgrade software.

At block 490, the upgrade simulator may determine that abnormal or exceptional situations occurred, and the simulated upgrade process failed. In this case, the upgrade simulator may stop/halt the simulating of the upgrade process, collect error messages, generate upgrade reports, and inform the administrator the details about the failed upgrade process.

Thus, systems and methods for simulating end-to-end upgrade process have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, microcomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for determining upgrade compatibility of a production system running at least one virtual machine "VM"), comprising:
executing, at a management server separate from the production system, an upgrade simulator that performs stages comprising:
dynamically extracting from a VM manager, by the upgrade simulator, a system inventory that includes a hardware configuration of the production system, a software configuration of the production system, a customized configuration of the production system, and user data of the production system;
confirming, by the upgrade simulator, that hardware and software components of the production system are functioning normally;
determining, based on the system inventory, that upgrade software is compatible with the production system;
generating, by the upgrade simulator, a downsized inventory that includes a reduced hardware configuration relative to the hardware configuration of the production system, a reduced software configuration relative to the software configuration of the production system, a reduced custom configuration relative to the custom configuration of the production system, and reduced user data relative to the user data of the production system;
instructing the VM manager to configure a simulated system implementing the downsized inventory
applying the upgrade software to the simulated system; and
determining a status of the upgraded simulated system.

2. The method of claim 1, wherein the downsized inventory is configured to include a minimum hardware configuration and a minimum software configuration necessary to simulate interconnectivity among existing VMs in the production system.

3. The method of claim 1, wherein if the determined status reflects abnormal operation of the upgraded simulated system, stopping the upgrade process.

4. The method of claim 1, wherein determining that the upgrade software is compatible with the production system comprises comparing the production system's hardware and software configurations to a hardware compatibility matrix and a software compatibility matrix, respectively.

5. The method of claim 1, wherein if the determined status reflects normal operation of the upgraded simulated system, applying the upgrade software to the production system.

6. The method of claim 1, wherein the software configuration includes firmware configurations for the production system's hardware configuration.

7. The method of claim 1, further comprising storing, by the upgrade simulator, a warning or alert generated during application of the upgrade software.

8. A non-transitory, computer-readable medium comprising instruction that, when executed by a processor, determines upgrade compatibility of a production system running at least one virtual machine ("VM") by performing stages for:
dynamically extracting from a VM manager, by an upgrade simulator, a system inventory that includes a hardware configuration of the production system, a software configuration of the production system, a customized configuration of the production system, and user data of the production system;
determining, based on the system inventory, that upgrade software is compatible with the production system by comparing the production system's hardware and software configurations to a hardware compatibility matrix and a software compatibility matrix, respectively;
generating, by the upgrade simulator, a downsized inventory that includes a reduced hardware configuration relative to the hardware configuration of the production system, a reduced software configuration relative to the software configuration of the production system, a reduced custom configuration relative to the custom configuration of the production system, and reduced user data relative to the user data of the production system;
instructing the VM manager to configure a simulated system implementing the downsized inventory;
applying the upgrade software to the simulated system; and
determining a status of the upgraded simulated system.

9. The non-transitory, computer-readable medium of claim 8, wherein the downsized inventory is configured to include a minimum hardware configuration and a minimum software configuration necessary to simulate interconnectivity among existing VMs in the production system.

10. The non-transitory, computer-readable medium of claim 8, wherein if the determined status reflects abnormal operation of the upgraded simulated system, stopping the upgrade process.

11. The non-transitory, computer-readable medium of claim 8, wherein if the determined status reflects normal operation of the upgraded simulated system, applying the upgrade software to the production system.

12. The non-transitory, computer-readable medium of claim 8, wherein the software configuration includes firmware configurations for the production system's hardware configuration.

13. The non-transitory, computer-readable medium of claim 8, the stages further comprising storing, by the upgrade simulator, a warning or alert generated during application of the upgrade software.

14. A system configured to simulate an end-to-end upgrade process, the system comprising a hardware processor and memory coupled with the processor, wherein the memory is configured to provide the processor with instructions for performing stages comprising:

executing, at a management server separate from a production system running at least one virtual machine ("VM"), an upgrade simulator;

dynamically extracting from a VM manager, by the upgrade simulator, a system inventory that includes a hardware configuration of the production system, a software configuration of the production system, a customized configuration of the production system, and user data of the production system;

determining, based on the system inventory, that upgrade software is compatible with the production system by comparing the production system's hardware and software configurations to a hardware compatibility matrix and a software compatibility matrix, respectively;

generating, by the upgrade simulator, a downsized inventory that includes a reduced hardware configuration relative to the hardware configuration of the production system, a reduced software configuration relative to the software configuration of the production system, a reduced custom configuration relative to the custom configuration of the production system, and reduced user data relative to the user data of the production system;

instructing the VM manager to configure a simulated system implementing the downsized inventory;

applying the upgrade software to the simulated system; and determining a status of the upgraded simulated system.

15. The system of claim 14, wherein the downsized inventory is configured to include a minimum hardware configuration and a minimum software configuration necessary to simulate interconnectivity among existing VMs in the production system.

16. The system of claim 14, wherein if the determined status reflects abnormal operation of the upgraded simulated system, stopping the upgrade process.

17. The system of claim 14, wherein determining that the upgrade software is compatible with the production system comprises comparing the production system's hardware and software configurations to a hardware compatibility matrix and a software compatibility matrix, respectively.

18. The system of claim 14, wherein if the determined status reflects normal operation of the upgraded simulated system, applying the upgrade software to the production system.

19. The system of claim 14, the stages further comprising storing, by the upgrade simulator, a warning or alert generated during application of the upgrade software.

* * * * *